(12) United States Patent  
Reilly et al.

(10) Patent No.: US 7,461,607 B2  
(45) Date of Patent: Dec. 9, 2008

(54) APPARATUS FOR ATTACHING A PONTOON TO A WATERCRAFT

(76) Inventors: Michael Bruce Reilly, 10766 Doncaster Crescent, Delta, BC (CA) V4C 8A6; Bradley Ryan Madu, 4901 205A Street, Langley, BC (CA) V3A 2A8; Phillip Noel Carter, 19650 55A Avenue, Langley (CA) V3A 3X2; Scott Billings, 203-5668 192nd Street, Langley (CA) V3S 2V7

( * ) Notice: Subject to any disclaimer, the term of this patent is extended or adjusted under 35 U.S.C. 154(b) by 48 days.

(21) Appl. No.: 11/278,391

(22) Filed: Mar. 31, 2006

(65) Prior Publication Data

US 2007/0039535 A1    Feb. 22, 2007

(51) Int. Cl.
B63B 1/00   (2006.01)
B63B 3/00   (2006.01)
B63B 5/00   (2006.01)

(52) U.S. Cl. .................. 114/61.15; 114/61.1; 114/88
(58) Field of Classification Search .............. 114/61.1, 114/61.15, 88; 403/52, 90
See application file for complete search history.

(56) References Cited

U.S. PATENT DOCUMENTS 3,504,389 A * 4/1970 Longbottom .................. 14/13
4,243,356 A * 1/1981 Takojima ..................... 414/723

* cited by examiner

Primary Examiner—Lars A Olson
Assistant Examiner—Daniel V Venne
(74) Attorney, Agent, or Firm—Clark Wilson LLP; Michael J. Roman

(57) ABSTRACT

The present invention relates to an apparatus for attaching a pontoon to a watercraft. There is provided an a first quick-coupler adapted to be connected to the pontoon and a second quick-coupler, complemental with the first quick-coupler, adapted to be connected to the hull, wherein the first and second quick-couplers together have at least three of the following: (i) lugs that close back on themselves to form one of an open loop and a closed loop, (ii) multiple lugs arranged in a triangle, (iii) both a fixed hook and a latch, (iv) two hooks that engage the same lug and (v) two non-parallel hooks that engage the same lug.

19 Claims, 7 Drawing Sheets

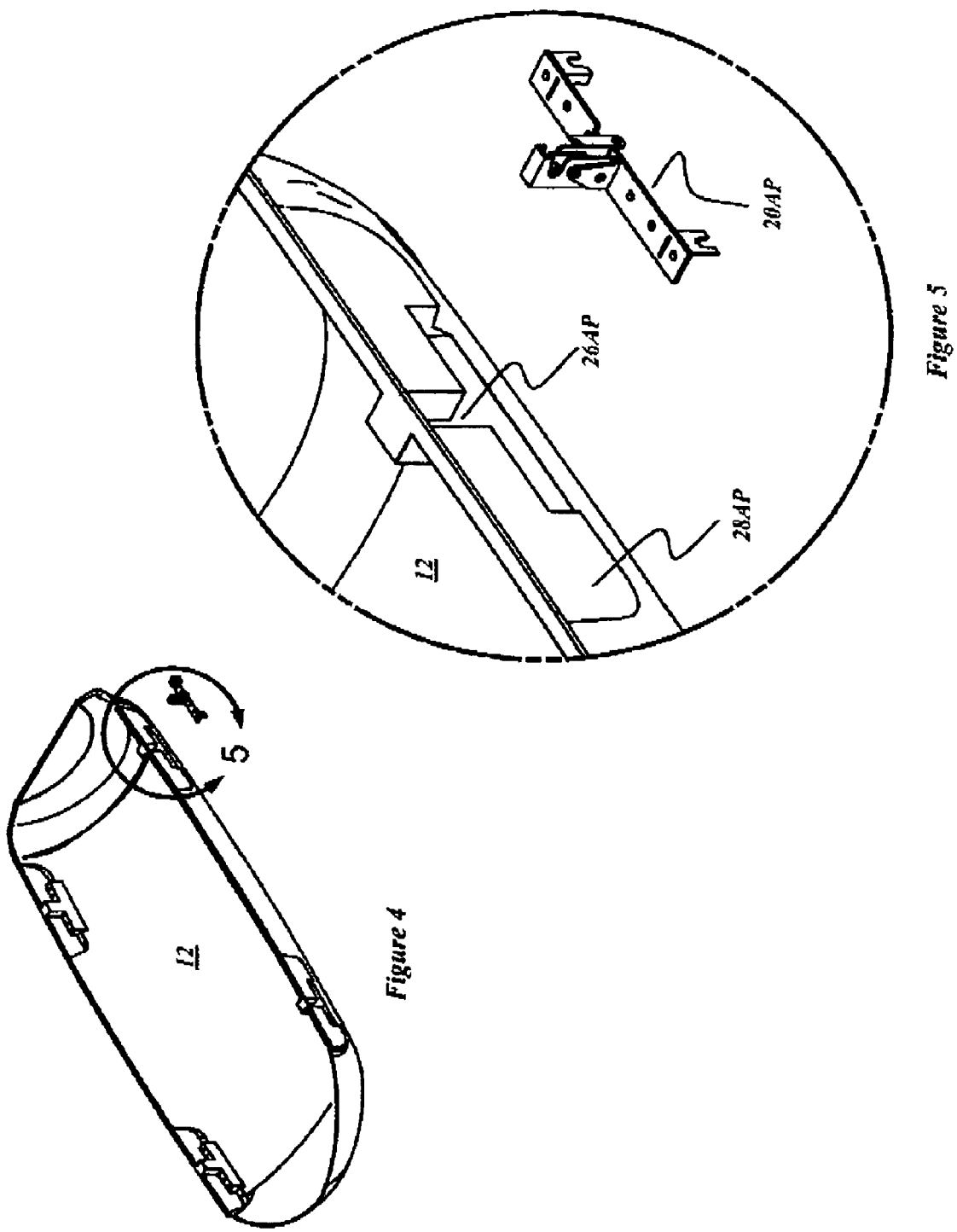

APPARATUS FOR ATTACHING A PONTOON TO A WATERCRAFT

BACKGROUND OF THE INVENTION

1. Field of the Invention

The present invention relates to a way to attach a pontoon to a watercraft, and in particular relates to a safety-conscious quick-connect/quick-release way to attach a pontoon to a watercraft.

2. Description of Related Art

Pontoons are a key part of many watercraft, contributing additional stability and buoyancy not otherwise available from a hull on its own. Unfortunately, when the watercraft is being transported over land, for example on a trailer or a car-top carrier, the pontoons contribute nothing but encumbrance. It is therefore desirable that the pontoons be connected when the watercraft travels over water and released when the watercraft travels over land.

It is further desirable that the pontoons be quickly and easily connected and released; otherwise, users might tend to leave them permanently attached to the hull because regularly connecting and releasing them could be more inconvenient than their encumbrance.

Nevertheless, it is undesirable that the pontoons release too easily, for example when not intended by the user. In fact, the related art has been shy to adopt quick-connect/quick-release couplers, tending to favour less convenient screw mountings and bolted joints.

Accordingly, what is needed is a safety-conscious quick-connect/quick-release way to attach a pontoon to a watercraft.

SUMMARY OF THE INVENTION

The present invention is directed to this need.

According to one aspect of there present invention, there is provided an apparatus for attaching a pontoon to a hull, having a first quick-coupler adapted to be connected to the pontoon and a second quick-coupler, complemental with the first quick-coupler, adapted to be connected to the hull, wherein the first and second quick-couplers together have at least three of the following:

i. lugs that close back on themselves to form one of an open loop and a closed loop;
  ii. multiple lugs arranged in a triangle;
  iii. both a fixed hook and a latch;
  iv. two hooks that engage the same lug; and
  v. two non-parallel hooks that engage the same lug.

The first quick-coupler may be one of a latch-assembly and a lug-assembly. If the first quick-coupler is a latch-assembly, then the second quick-coupler is a lug-assembly; if the first quick-coupler is a lug-assembly, then the second quick-coupler is a latch-assembly.

The lug-assembly has a first lug and a second lug and may even have a third lug, with the lugs being arranged in a triangular pattern, for example as mounted on a T-shaped member. The lugs themselves can be U-shaped.

The latch-assembly has a hook-member complemental with the first lug and a latch-member complemental with the second lug. In one embodiment, the hook-member includes a first hook adapted to releasably engage the first lug at a first position and a second hook adapted to releasably engage the first lug at a second position.

The hook-member can be oriented such that the prevailing force on the pontoon will urge the first lug into engagement with the hook-member. Similarly, the latch-member can be oriented with respect to the hook-member such that when the first lug is engaged within the hook-member, the prevailing force on the pontoon will urge the second lug into engagement with the latch-member.

The latch-member can include a second hook-member disposed such that the hook-members and the latch-member are arranged in a triangular pattern similar to the lugs. This arrangement might be accomplished, for example, by mounting the hook-members and the latch-member on an elongated member.

The apparatus might include a pontoon and a hull. When not attached to the hull, the pontoon could fit within the hull for storage or could be operable as a life raft.

The pontoon could define a first recess for retaining the first quick-coupler and the hull could define a second recess for retaining the second quick-coupler, in which case the pontoon might define a first abutment at least partially framing the first recess and the hull might define a complemental second abutment at least partially framing the second recess.

The apparatus might further include an elongated seating-member fitted transversely within the hull and inline with the first and second quick-couplers so as to brace the pontoon. The seating-member, the hull, and the second quick-coupler could be fastened together. Additionally, the second recess might protrude inside the hull to mate with the seating-member.

According to another aspect of the present invention, there is provided a pontoon and a first quick-coupler, as described above according to the first aspect of the invention, connected to the pontoon.

According to yet another aspect of the present invention, there is provided a hull and a second quick-coupler, as described above according to the first aspect of the invention, connected to the hull.

Further aspects and advantages of the present invention will become apparent upon considering the following drawings, description, and claims.

DESCRIPTION OF THE INVENTION

The invention will be more fully illustrated by the following detailed description of non-limiting specific embodiments in conjunction with the accompanying drawing figures. In the figures, similar components and/or features may have the same reference label. Further, various components of the same type may be distinguished by following the reference label with a second label that distinguishes among the similar components. If only the first reference label is identified in a particular passage of the detailed description, then that passage describes any one of the similar components having the same first reference label irrespective of the second reference label.

BRIEF DESCRIPTION OF THE DRAWINGS

FIG. 4 is an oblique top-front-right view of the right rear portion of the hull of FIG. 2 and its respective quick-coupler;

FIG. 5 is an oblique top-front-right detail view of the right rear portion of the hull of FIG. 4 and its respective quick-coupler;

DETAILED DESCRIPTION OF SPECIFIC EMBODIMENTS

(a) Structure of Specific Embodiments

Figure 1:
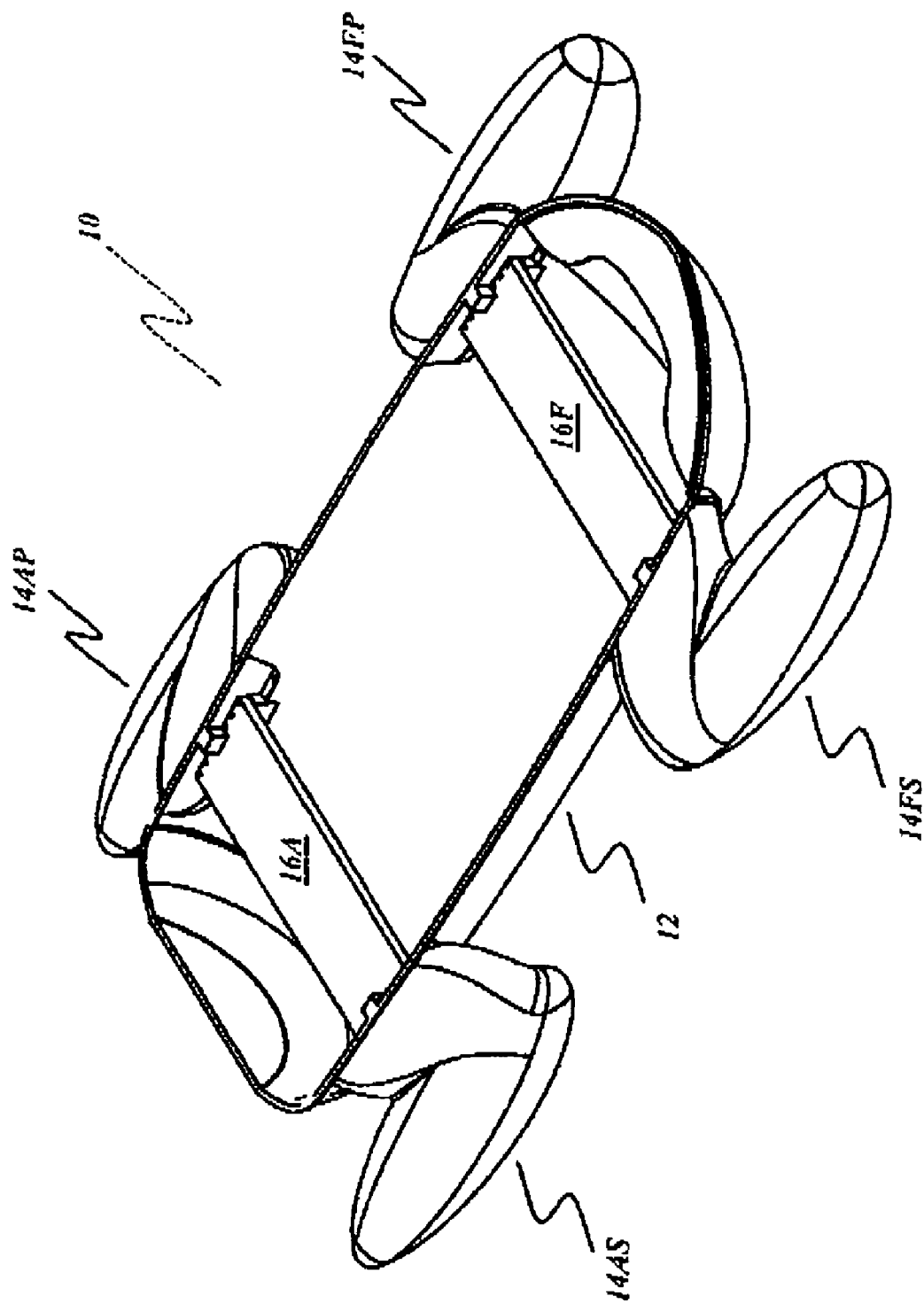
FIG. 1 is an oblique top-front-left view of a watercraft having forward and aft pairs of pontoons attached to a hull according to one embodiment of the present invention.

The structure of the invention will now be illustrated by way of explanation of non-limiting specific exemplary embodiments shown in the drawing figures and described in greater detail herein.

Figure 2:
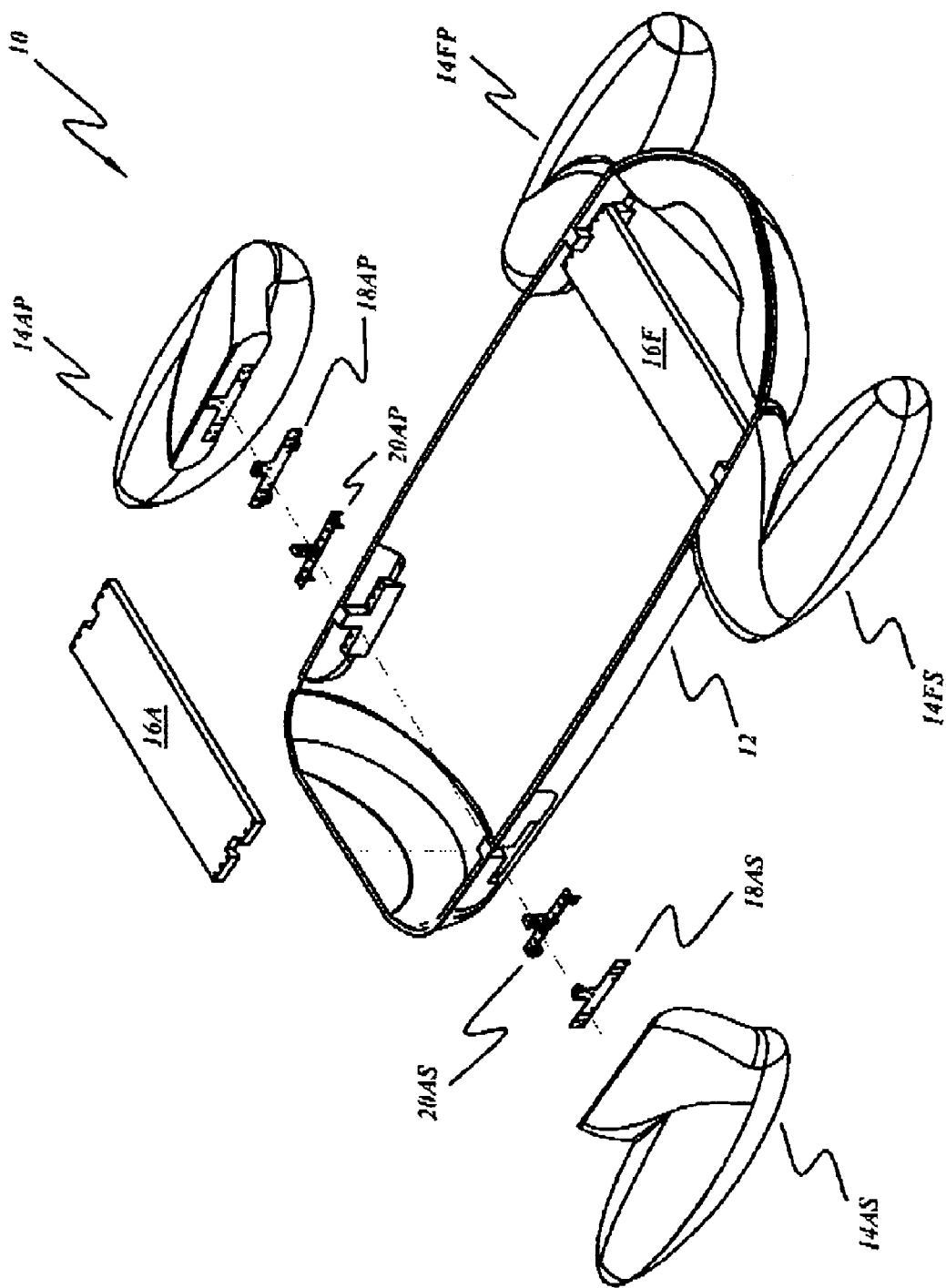
FIG. 2 is an oblique top-front-left view of the watercraft of FIG. 1, partially exploded to illustrate the way the aft pair of pontoons is attached to the hull by complemental quick-couplers respectively borne by the pontoons and the hull.

FIGS. 1 and 2 show a watercraft, generally illustrated at 10. The watercraft 10 has a hull 12 and four pontoons 14, namely a forward-starboard pontoon 14FS, a forward-port pontoon 14FP, an aft-starboard pontoon 14AS and an aft-port pontoon 14AP. The watercraft 10 also has two seats 16, namely a forward seat 16F and an aft seat 16A, that are fitted transversely within the hull 12 and respectively inline with the forward pontoons 14F and the aft pontoons 14A so as to brace the pontoons 14 and the hull 12.

The pontoons 14 are attached to the hull 12 according to one embodiment of the present invention. FIG. 2 shows in greater detail the way in which the aft pontoons 14A are attached to the hull 12; the forward pontoons 14 may be attached in the same way. Each aft pontoon 14A supports a first quick-coupler 18, which is disposed toward the hull 12 when the pontoon is aligned with the hull 12 in its attachment orientation. Correspondingly, the hull 12 supports a complemental second quick-coupler 20 facing outward from its outside surface proximate the seat 16. Although fasteners have not been depicted for the purpose of clarity, the seat 16, the hull 12 and the second quick-coupler 20 would generally be fastened together. With the first quick-coupler 18 and the second quick-coupler 20 coupled together, the seat 16 is inline with the first quick-coupler 18 and the second quick-coupler 20 so as to brace the pontoon 14.

Figure 3:
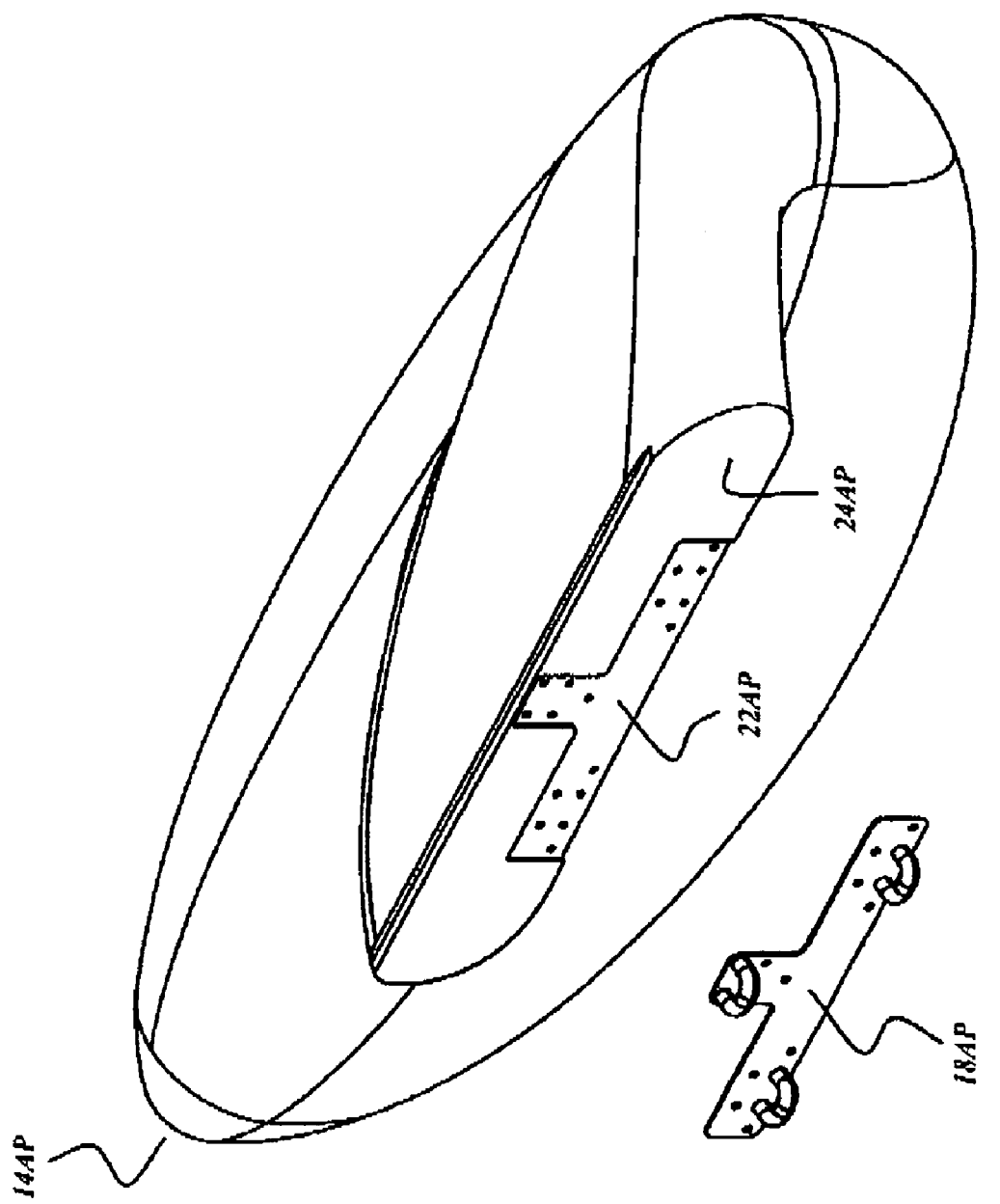
FIG. 3 is an oblique top-front-left view of the right rear pontoon of FIG. 2 and its respective quick-coupler.
Figure 6A:
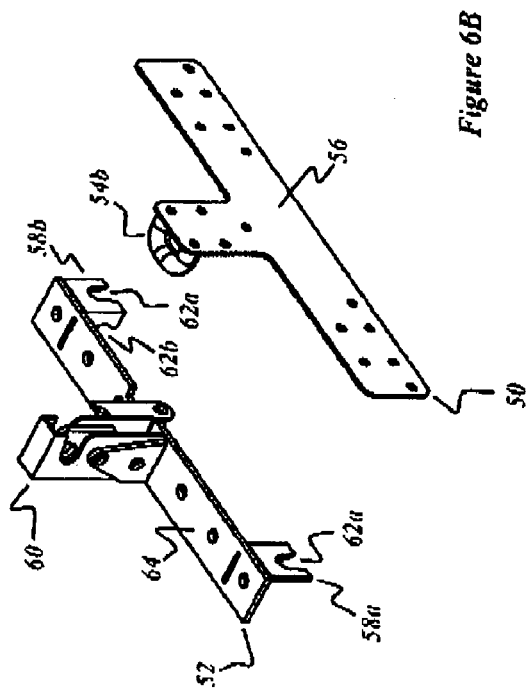
FIG. 6 are oblique views of one embodiment of the complemental quick-couplers of FIG. 2, in this embodiment being a lug-assembly and a latch-assembly respectively.
Figure 6B:
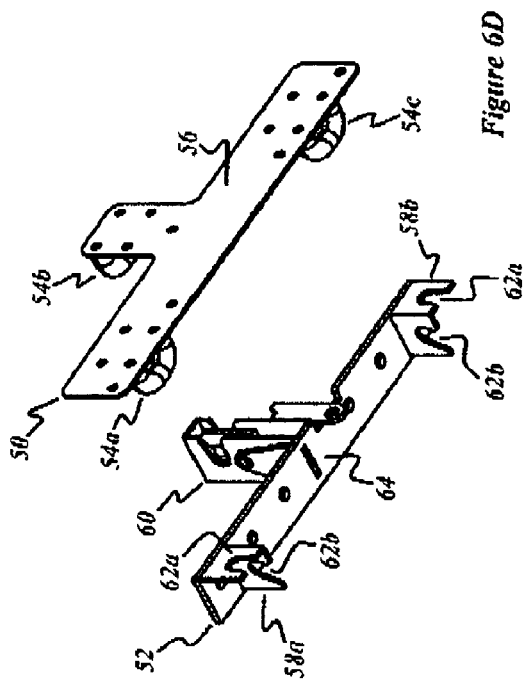
Figure 6C:
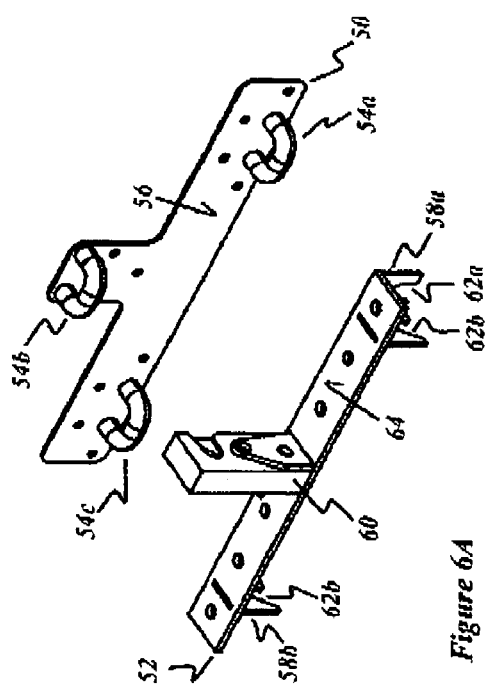
Figure 6D:
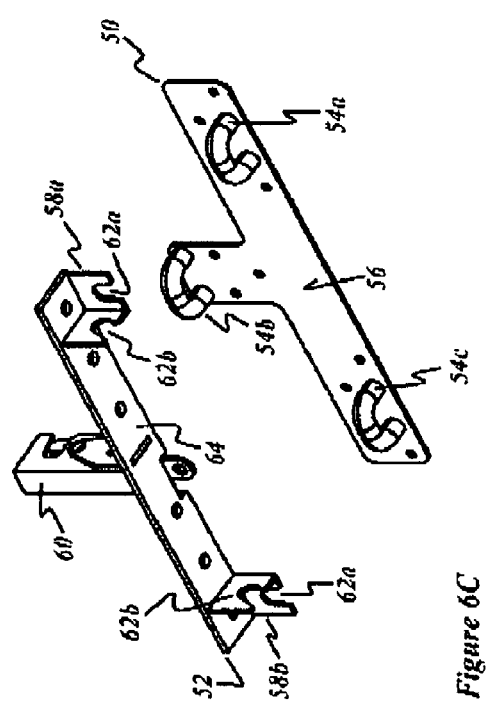
Figure 7B:
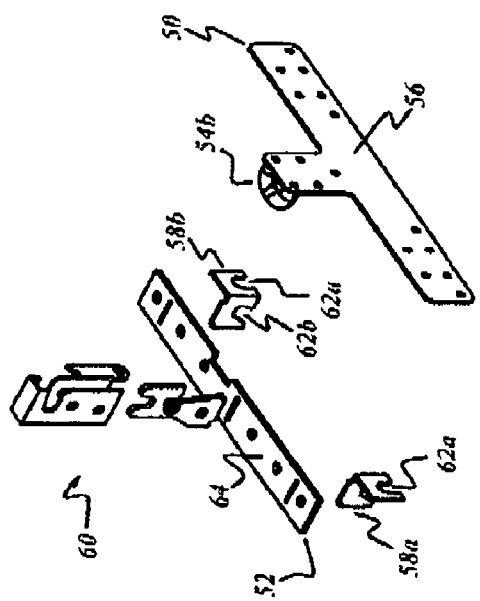
FIG. 7 are oblique partially exploded views of the lug-assembly and latch-assembly of FIG. 6 in the disconnected configuration.
Figure 7D:
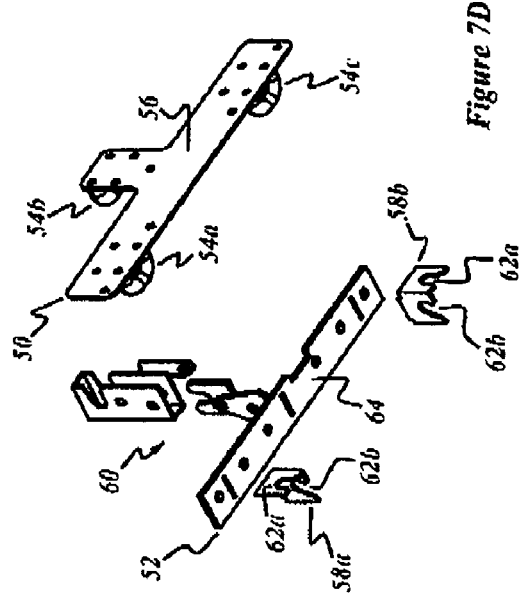
Figure 7A:
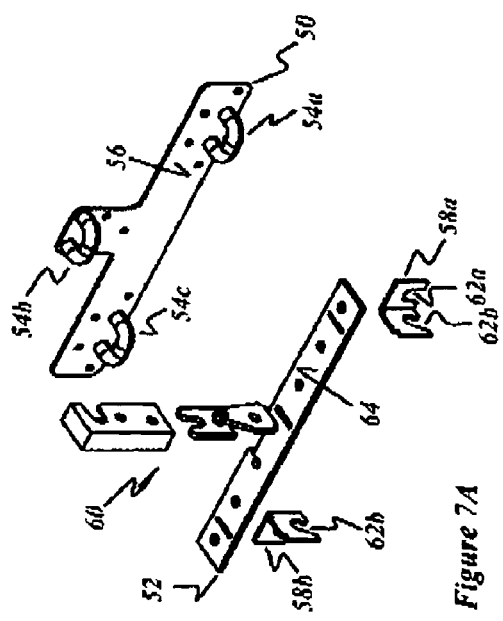
Figure 7C:
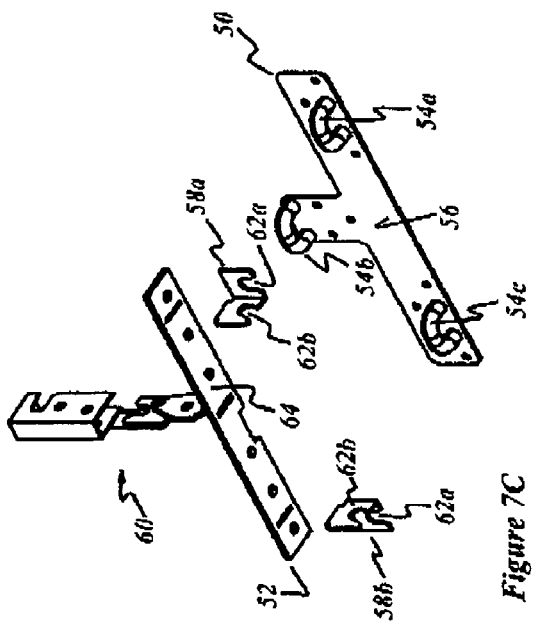
Figure 8B:
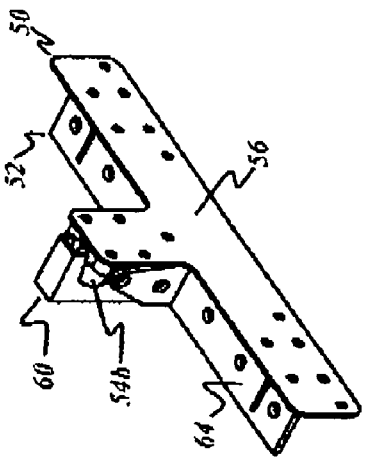
FIG. 8 are oblique views of the lug-assembly and latch-assembly of FIG. 6 in a latched configuration.
Figure 8D:
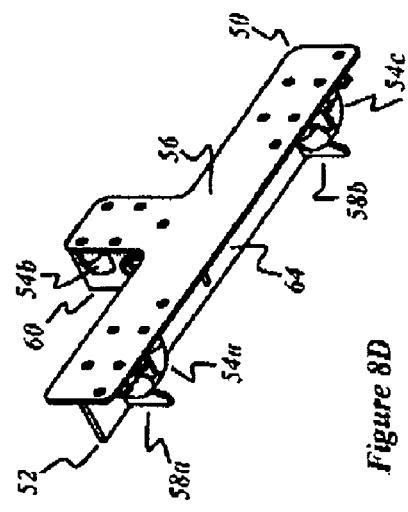
Figure 8E:
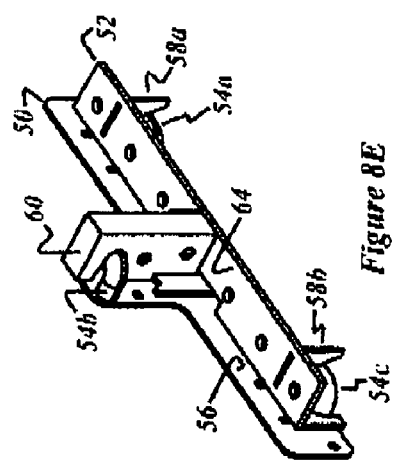
Figure 8A:
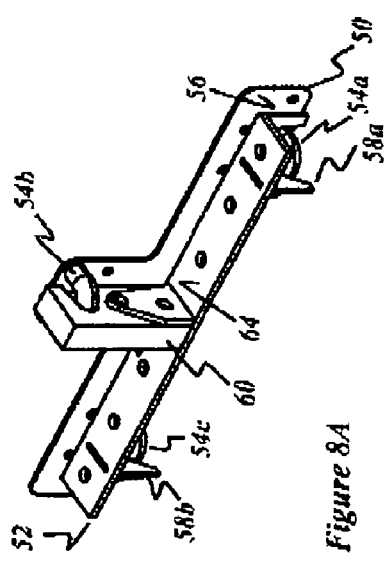
Figure 8C:
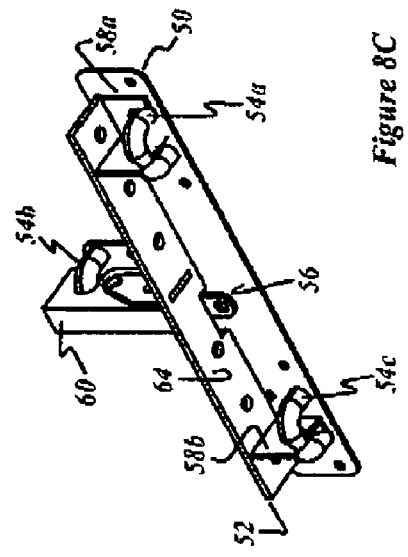

FIG. 3 shows the aft-port pontoon 14AP and its first quick-coupler 18AP in greater detail. The first quick-coupler 18 may be attached to the pontoon 14 by various conventional means, including mechanical fasteners (whether threaded or otherwise), chemical bonding, integral forming, press-fitting or other mechanical coupling. As illustrated in FIG. 3, the first quick-coupler 18 is attached to the pontoon 14 by threaded mechanical fasteners, which have not been explicitly depicted to maintain clarity. It will be seen that the pontoon 14 also defines a first recess 22 for retaining the first quick-coupler 18 and a first abutment 24, at least partially framing the first recess 22.

FIGS. 4 and 5 show the aft-port portion of the hull 12 in greater detail, emphasizing the placement of the aft port second quick-coupler 20AP. The second quick-coupler 20 may be attached to the hull 12 by various conventional means, including mechanical fasteners (whether threaded or otherwise), chemical bonding, integral forming, press-fitting or other mechanical coupling. As illustrated in FIGS. 4 and 5, the second quick-coupler 20 is attached to the hull 12 by threaded mechanical fasteners, which have not been explicitly depicted to maintain clarity. It will be seen that the hull 12 also defines a second recess 26 for retaining the second quick-coupler 20 and a second abutment 28, at least partially framing the second recess 26 and complemental with the first abutment 24 on the pontoon 14 to provide a better butt joint between the hull 12 and the pontoon 14. As best seen in FIGS. 1 and 2, the second recess 26 may protrude inside the hull 12 to mate with the seat 16.

The first quick-coupler 18 and second quick-coupler 20 are adapted to provide safety-conscious quick-connection and quick-release, meaning that they are adapted to be easily and quickly connected and released when one intends to do so, but not when one doesn't intend so. These quick-couplers 18, 20 are characterized by a number of convenience and safety features, either singly or in combination, including: lugs that close back on themselves to form an open or closed loop, such as U-shaped lugs; multiple lugs arranged in stable configurations, such as a triangle; combinations of easily engaged open-ended fixed hooks and more secure latches; and combinations of hooks that engage the same lug, for example orthogonally disposed hooks that engage a U-shaped lug at different positions.

To better illustrate these characteristics of such complemental quick-couplers 18, 20, FIGS. 6 through 8 depict a specific embodiment: a lug-assembly 50 and a complemental latch-assembly 52. However, those skilled in the art will appreciate that such characteristics could be differently combined.

The lug-assembly 50 includes a first lug 54a, a second lug 54b and a third lug 54c mounted on a T-shaped member 56, advantageously at the three points of a triangle for strength and stability. Each lug 54 advantageously forms a closed loop to more securely and accurately engage complemental hooks, and in this embodiment is U-shaped.

The latch-assembly 52 includes a first hook-member 58a, a second hook-member 58b and a lockable latch-member 60, which are respectively complemental with the first lug 54a, the third lug 54c, and the second lug 54b. Each hook-member 58 includes a first hook 62a and a second hook 62b that may be parallel, oblique or advantageously orthogonal to the first hook 62a, the hook-members 58 being adapted by their respective hooks 62 to releasably engage their respective lugs 54 at more than one position for added security and stability. The hook-members 58 and the latch-member 60 are mounted to an elongated member 64 to form a triangle of attachment points complemental with that of the lug-assembly 50.

(b) Operation of Specific Embodiments

With reference now to FIGS. 1 through 8, the operation of the specific embodiments of the invention will now be described.

As best seen in FIGS. 1 through 5, pontoons 14 bearing first quick-couplers 18 are attached to the hull 12 via complemental second quick-couplers 20 fastened to the hull 12 and the seats 16. In this arrangement, the seats 16 brace the pontoons 14 and the hull 12.

As best shown in FIGS. 6 through 8, the connection between the complemental quick-couplers 18, 20 will be seen more clearly, as embodied by the lug-assembly 50 and the latch-assembly 52.

The first lug 54a and third lug 54c are inserted into the first hook-member 58a and the second hook-member 58b respectively. The lug-assembly 50 and latch-assembly 52 are then pivoted together about an axis common to the first lug 54a and the third lug 54c until the second lug 54b is secured within the latch-member 60. In this regard, upon initial insertion the first lug 54a and the third lug 54c are engaged by only the respective second hooks 62b, but after pivoting are also engaged by the respective first hooks 62a, providing a second point of contact and a second axis of engagement.

It will be observed that the lug-assembly 50 and latch-assembly 52 have been so arranged that when the watercraft 10 is on the water, the prevailing force on the pontoon 14 will urge the first lug 54a into engagement with the first hook-member 58a and the third lug 54c into engagement with the second hook-member 58b. Similarly, the latch-member 60 is oriented with respect to the hook-members 58 such that the prevailing force on the pontoon 14 will urge the second lug 54b into engagement with the latch-member 60. The latch-member 60 can be locked in its latched position for greater security or safety, for example with a padlock, not shown.

The pontoons 14 may be released from the hull 12 by unlocking (if locked) and releasing the respective latch-members 60 and urging the respective lugs 54 from both the latch-member 60 and the respective hook-members 58. To perform this operation while the watercraft if on the water, one would need to overcome the prevailing force on the pontoons 14; however, if one intended to do so, one could. In such event, the pontoons 14 could be operable independently of the hull 12 as life rafts. If removed when ashore, the pontoons 14 could be conveniently stored within the hull 12.

(c) Description Summary

Thus, it will be seen from the foregoing embodiments and examples that there has been described a safety-conscious quick-connect/quick-release way to attach a pontoon to a watercraft.

While specific embodiments of the invention have been described and illustrated, such embodiments should be considered illustrative of the invention only and not as limiting the invention as construed in accordance with the accompanying claims.

It will be understood by those skilled in the art that various changes, modifications and substitutions can be made to the foregoing embodiments without departing from the principle and scope of the invention expressed in the claims made herein.

For example, although the lug-assembly has been illustrated as being attached to the pontoon and the latch-assembly has been illustrated as being attached to the hull, the latch-assembly could be attached to the pontoon and the lug-assembly attached to the hull instead. Similarly, a quick-coupler, as defined herein, might include various latch-members, hook-members and lugs in different combinations and configurations than embodied by the lug-assembly and latch-assembly described and illustrated herein. Furthermore, a lug-assembly might include latches and a latch-assembly might include lugs without departing from the intent of the present invention.

While the invention has been described as having particular application for small watercraft those skilled in the art will recognize it has wider application, for example for larger watercraft and for other marine and non-marine equipment.

What is claimed is:

1. An apparatus for attaching a pontoon to a hull, comprising:
   (a) a first quick-coupler adapted to be connected to the pontoon; and
   (b) a second quick-coupler, complemental with the first quick-coupler, connected to the hull,
   (c) wherein the first and second quick-couplers together have at least three of the following:
      (i) lugs that close back on themselves to form one of an open loop and a closed loop;
      (ii) multiple lugs arranged in a triangle;
      (iii) both a fixed hook and a latch;
      (iv) two hooks that engage the same lug; and
      (v) two non-parallel hooks that engage the same lug.

2. An apparatus as claimed in claim 1, wherein:
   (a) the first quick-coupler is one of:
      (i) a latch-assembly; and
      (ii) a lug-assembly;
   (b) if the first quick-coupler is a latch-assembly, then the second quick-coupler is a lug-assembly; and
   (c) if the first quick-coupler is a lug-assembly, then the second quick-coupler is a latch-assembly.

3. An apparatus as claimed in claim 2, wherein the lug-assembly comprises:
   (a) a first lug; and
   (b) a second lug.

4. An apparatus as claimed in claim 3, wherein the lugs are U-shaped.

5. An apparatus as claimed in claim 4, wherein:
   a) the lug-assembly further comprises a third lug; and
   b) the lugs are arranged in a triangular pattern.

6. An apparatus as claimed in claim 5, wherein the lugs are mounted on a T-shaped member.

7. An apparatus as claimed in claim 3, wherein the latch-assembly comprises:
   (a) a hook-member complemental with the first lug; and
   (b) a latch-member complemental with the second lug.

8. An apparatus as claimed in claim 7, wherein the hook-member comprises:
   (a) a first hook adapted to releasably engage the first lug at a first position; and
   (b) a second hook adapted to releasably engage the first lug at a second position.

9. An apparatus as claimed in claim 8, wherein the hook-member is oriented such that the prevailing force on the objects will urge the first lug into engagement with the hook-member.

10. An apparatus as claimed in claim 9, wherein the latch-member is oriented with respect to the hook-member such that when the first lug is engaged within the hook-member, the prevailing force on the objects will urge the second lug into engagement with the latch-member.

11. An apparatus as claimed in claim 10, wherein:
   (a) the latch-assembly further comprises a second hook-member; and
   (b) the hook-members and the latch-member are arranged in a triangular pattern.

12. An apparatus as claimed in claim 11, wherein the hook-members and the latch-member are mounted on an elongated member.

13. An apparatus as claimed in claim 1, wherein the pontoon fits within the hull when not attached to the hull.

14. An apparatus as claimed in claim 1, wherein the pontoon is operable as a life raft when not attached to the hull.

15. An apparatus as claimed in claim 1, wherein
   (a) the pontoon defines a first recess for retaining the first quick-coupler; and
   (b) the hull defines a second recess for retaining the second quick-coupler.

16. An apparatus as claimed in claim 15, wherein:
(a) the pontoon defines a first abutment at least partially framing the first recess; and
(b) the hull defines a complemental second abutment at least partially framing the second recess.

17. An apparatus as claimed in claim 1, further comprising an elongated seating-member fitted transversely within the hull and inline with the first and second quick-couplers so as to brace the pontoon.

18. An apparatus as claimed in claim 17, wherein the seating-member, the hull, and the second quick-coupler are fastened together.

19. An apparatus as claimed in claim 17, wherein the second recess protrudes inside the hull and mates with the seating-member.

* * * * *